(12) United States Patent
Gray et al.

(10) Patent No.: US 11,168,968 B2
(45) Date of Patent: Nov. 9, 2021

(54) PLUG GAUGES AND ASSOCIATED SYSTEMS AND METHODS FOR TAKING MULTIPLE SIMULTANEOUS DIAMETRIC MEASUREMENTS

(71) Applicant: The Boeing Company, Chicago, IL (US)

(72) Inventors: Everette D. Gray, Seattle, WA (US); Mark Albrecht, Lake Stevens, WA (US); Kwok Tung Chan, Seattle, WA (US)

(73) Assignee: The Boeing Company, Chicago, IL (US)

( * ) Notice: Subject to any disclaimer, the term of this patent is extended or adjusted under 35 U.S.C. 154(b) by 210 days.

(21) Appl. No.: 16/698,691

(22) Filed: Nov. 27, 2019

(65) Prior Publication Data

US 2021/0156660 A1     May 27, 2021

(51) Int. Cl.
*G01B 3/46*     (2006.01)
*G01B 5/12*     (2006.01)

(52) U.S. Cl.
CPC ....... *G01B 3/46* (2013.01); *G01B 5/12* (2013.01)

(58) Field of Classification Search
CPC .................................... G01B 3/46; G01B 5/12
USPC ........................................................ 33/556
See application file for complete search history.

(56) References Cited

U.S. PATENT DOCUMENTS

| | | | |
|---|---|---|---|
| 4,058,901 A * | 11/1977 | Lendi | G01B 3/26 33/544.6 |
| 4,170,831 A | 10/1979 | Olasz | |
| 4,344,233 A * | 8/1982 | Albertazzi | G01B 7/282 33/501.06 |
| 4,414,508 A | 11/1983 | Davis et al. | |
| 9,518,851 B2 | 12/2016 | Bergman et al. | |
| 10,161,914 B2 | 12/2018 | Bergman et al. | |
| 2020/0271481 A1* | 8/2020 | Albrecht | G01B 7/287 |
| 2020/0284571 A1* | 9/2020 | Albrecht | F16J 15/3276 |

(Continued)

OTHER PUBLICATIONS

Capacitec, "Non-contact Capacitive Hole Diameter Sensor Probes," https://www.capacitec.com/Products/Hole-Measurinq-Systems/Hole-Diameter-Probes (2019).

(Continued)

*Primary Examiner* — Yaritza Guadalupe-McCall

(74) *Attorney, Agent, or Firm* — Walters & Wasylyna LLC

(57) ABSTRACT

A plug gauge including a probe housing defining an internal volume and a longitudinal axis, the probe housing includes a first and second openings, a first contact element having a portion extending through the first opening, a first cam member defining a first axis of rotation, the first cam member being in camming engagement with the first contact element such that movement of the first contact element relative to the probe housing causes corresponding rotation of the first cam member about the first axis of rotation, a second contact element having a portion extending through the second opening, and a second cam member defining a second axis of rotation, the second cam member being in camming engagement with the second contact element such that movement of the second contact element relative to the probe housing causes corresponding rotation of the second cam member about the second axis of rotation.

20 Claims, 13 Drawing Sheets

(56) References Cited

U.S. PATENT DOCUMENTS

2021/0156660 A1* 5/2021 Gray ..................... G01B 3/46

OTHER PUBLICATIONS

Willrich Precision Instrument, "Mahr Federal Dimentron Plug," https://willrich.com/ (2019).
Diatest, "BMD-Plug Gauge," http:www.diatest.com/products/solutions-for-gauging/measurement-of-diameter-and-length (2019).
Diatest, "Automated measurement in CNC machines," Diatest News (2019).

* cited by examiner

PLUG GAUGES AND ASSOCIATED SYSTEMS AND METHODS FOR TAKING MULTIPLE SIMULTANEOUS DIAMETRIC MEASUREMENTS

FIELD

This application relates to bore metrology and, more particularly, to plug gauges and associated systems and methods for taking multiple simultaneous diametric measurements of a bore on a single plane.

BACKGROUND

The interior surface of a bore formed in a structure may, for a variety of reasons, vary from its intended dimensions. Inconsistencies in manufacturing processes may result in a bore that is tapered or otherwise non-compliant. Further, use of the structure may cause the bore to become eroded, irregular or uneven in some manner. A compromised bore may result in additional complications in manufacturing, such as the inability to install a fastener, or even preclude further use of the structure. As such, the ability to inspect the interior surface of a bore is of critical importance to ensure that the bore is sufficient for its intended application.

Contact probes (e.g., probes that collect data by making physical contact with a surface) are a type of measuring tool that may be used to evaluate the surface of a bore. Their ability to do so is dependent on the total number of contact elements on the contact probe as well as their method of operation. Typically, contact probes require numerous strokes into and out of the bore to adequately characterize the surface along the entire circumference of the bore, which adds undesired time to production.

Accordingly, those skilled in the art continue with research and development efforts in the field of bore metrology.

SUMMARY

Disclosed are plug gauges, which can be used for bore metrology.

In one example, the disclosed plug gauge includes a probe housing defining an internal volume and a longitudinal axis, the probe housing includes a first opening into the internal volume and a second opening into the internal volume, a first contact element received in the internal volume of the probe housing, wherein a portion of the first contact element extends through the first opening, a first cam member defining a first axis of rotation, the first cam member being in camming engagement with the first contact element such that movement of the first contact element relative to the probe housing causes corresponding rotation of the first cam member about the first axis of rotation, a second contact element received in the internal volume of the probe housing, wherein a portion of the second contact element extends through the second opening, and a second cam member defining a second axis of rotation, the second cam member being in camming engagement with the second contact element such that movement of the second contact element relative to the probe housing causes corresponding rotation of the second cam member about the second axis of rotation.

In another example, the disclosed plug gauge includes a probe housing defining an internal volume and a longitudinal axis, the probe housing including a first opening into the internal volume, a second opening into the internal volume, a third opening into the internal volume, and a fourth opening into the internal volume, wherein the first opening, the second opening, the third opening, and the fourth opening are aligned in a plane that is substantially (i.e., almost if not exactly) perpendicular to the longitudinal axis of the probe housing, a first contact element received in the internal volume of the probe housing, wherein a portion of the first contact element extends through the first opening, a third contact element received in the internal volume of the probe housing, wherein a portion of the third contact element extends through the third opening in the probe housing, and wherein the third contact element is aligned with the first contact element along a first contact element axis, a first cam member defining a first axis of rotation, the first cam member being in camming engagement with both the first contact element and the third contact element such that movement of the first contact element and the third contact element relative to the probe housing causes corresponding rotation of the first cam member about the first axis of rotation, a second contact element received in the internal volume of the probe housing, wherein a portion of the second contact element extends through the second opening, a fourth contact element received in the internal volume of the probe housing, wherein a portion of the fourth contact element extends through the fourth opening in the probe housing, and wherein the fourth contact element is aligned with the second contact element along a second contact element axis, and a second cam member defining a second axis of rotation, the second cam member being in camming engagement with both the second contact element and the fourth contact element such that movement of the second contact element and the fourth contact element relative to the probe housing causes corresponding rotation of the second cam member about the second axis of rotation, wherein the first opening, the second opening, the third opening, and the fourth opening are aligned in a plane that is substantially perpendicular to the longitudinal axis of the probe housing.

In yet another example, the disclosed plug gauge includes a probe housing defining an internal volume and a longitudinal axis, the probe housing including a first opening into the internal volume and a second opening into the internal volume, a third opening into the internal volume, and a fourth opening into the internal volume, wherein the first opening, the second opening, the third opening, and the fourth opening are aligned in a plane that is substantially perpendicular to the longitudinal axis of the probe housing, a first contact element received in the internal volume of the probe housing, wherein a portion of the first contact element extends through the first opening, a first cam member defining a first axis of rotation, the first cam member being in camming engagement with the first contact element such that movement of the first contact element relative to the probe housing causes corresponding rotation of the first cam member about the first axis of rotation, a second contact element received in the internal volume of the probe housing, wherein a portion of the second contact element extends through the second opening, a second cam member defining a second axis of rotation, the second cam member being in camming engagement with the second contact element such that movement of the second contact element relative to the probe housing causes corresponding rotation of the second cam member about the second axis of rotation, a third contact element received in the internal volume of the probe housing, wherein a portion of the third contact element extends through the third opening in the probe housing, and wherein the third contact element is aligned with the first contact element along a first contact element axis, a third cam member defining a third axis of rotation, the third cam member being in camming engagement with the third contact element such that movement of the third contact element relative to the probe housing causes corresponding rotation of the third cam member about the third axis of rotation, a fourth contact element received in the internal volume of the probe housing, wherein a portion of the fourth contact element extends through the fourth opening in the probe housing, and wherein the fourth contact element is aligned with the second contact element along a second contact element axis, and a fourth cam member defining a fourth axis of rotation, the fourth cam member being in camming engagement with the fourth contact element such that movement of the fourth contact element relative to the probe housing causes corresponding rotation of the fourth cam member about the fourth axis of rotation.

Also disclosed are systems for taking multiple simultaneous diametric measurements of a bore formed in a structure.

In one example, the disclosed system includes a plug gauge as disclosed herein, which is sized to be received in the bore, and a support connected to the plug gauge.

Also disclosed are methods for taking multiple simultaneous diametric measurements of a bore formed in a structure.

In one example, the disclosed method includes steps of (1) inserting a plug gauge as disclosed herein into the bore while the plug gauge is at a first orientation with respect to the longitudinal axis of the plug gauge; (2) rotating the plug gauge about the longitudinal axis to a second orientation with respect to the longitudinal axis; and (3) withdrawing the plug gauge from the bore.

Other examples of the disclosed plug gauges, systems and methods will become apparent from the following detailed description, the accompanying drawings and the appended claims.

DETAILED DESCRIPTION

Figure 1:
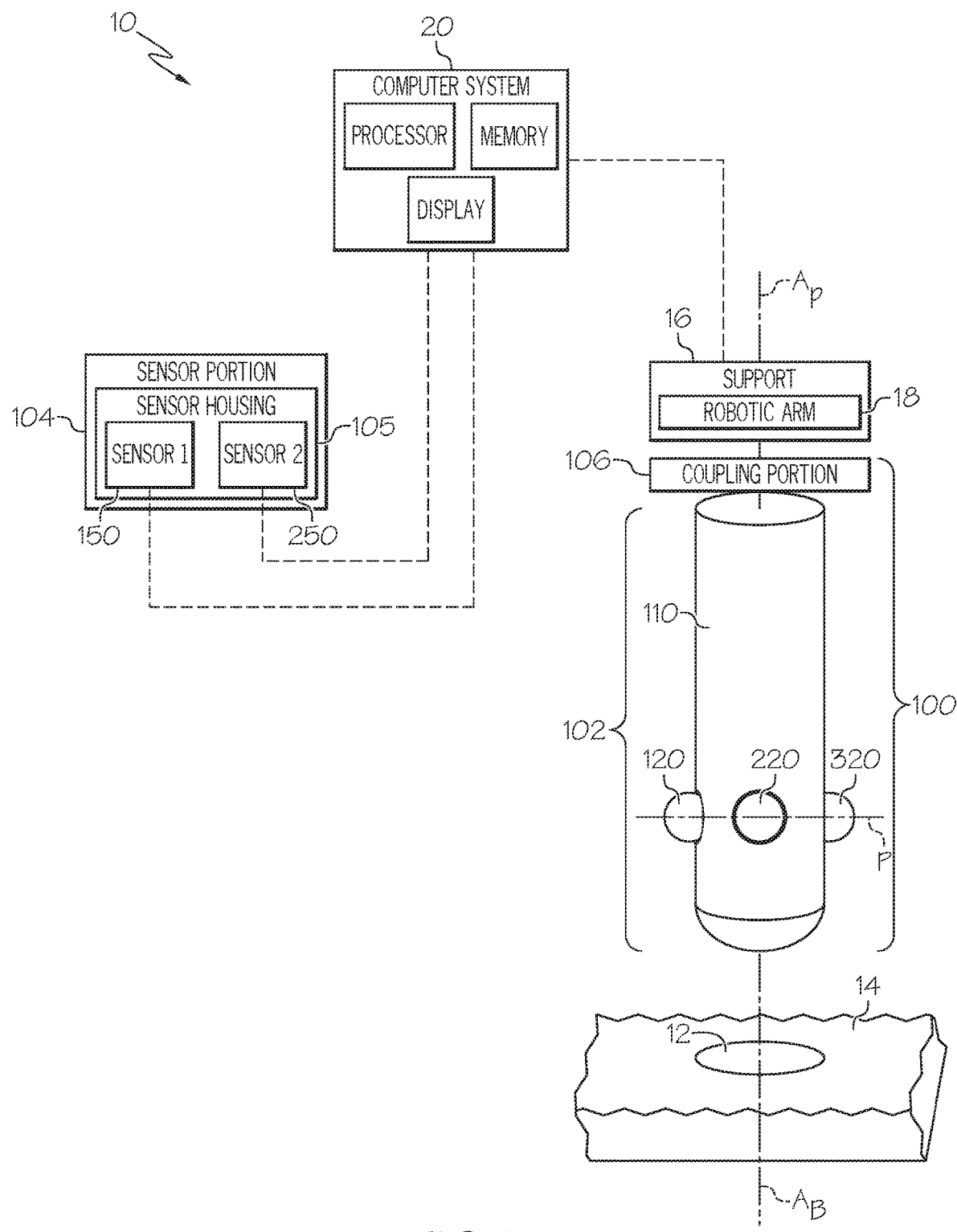
FIG. 1 depicts one example of the disclosed plug gauge and associated system for taking multiple simultaneous diametric measurements.

The following detailed description refers to the accompanying drawings, which illustrate specific examples described by the present disclosure. Other examples having different structures and operations do not depart from the scope of the present disclosure. Like reference numerals may refer to the same (or similar) feature, element or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Disclosed are plug gauges and associated systems and methods for taking multiple simultaneous diametric measurements of a bore. Significantly, the disclosed plug gauges, systems and methods take multiple simultaneous diametric measurements of a bore on the same plane, thereby increasing the amount of data collected for a given amount of time.

Referring to FIG. 1, one example of a system 10 for taking multiple simultaneous diametric measurements of a bore 12 formed in a structure 14 includes a plug gauge 100, a support 16 and a computer system 20. The plug gauge 100 may include a probe portion 102, a sensor portion 104 and a coupling portion 106. The probe portion 102 of the plug gauge 100 may be sized and shaped to be closely (i.e., with little or no space in between) received in the bore 12. The sensor portion 104 of the plug gauge 100 may sense relative movement within the probe portion 102 such that diametric measurements can be calculated. The coupling portion 106 of the plug gauge 100 may facilitate connecting the probe portion 102 of the plug gauge 100 to the support 16.

Figure 8:
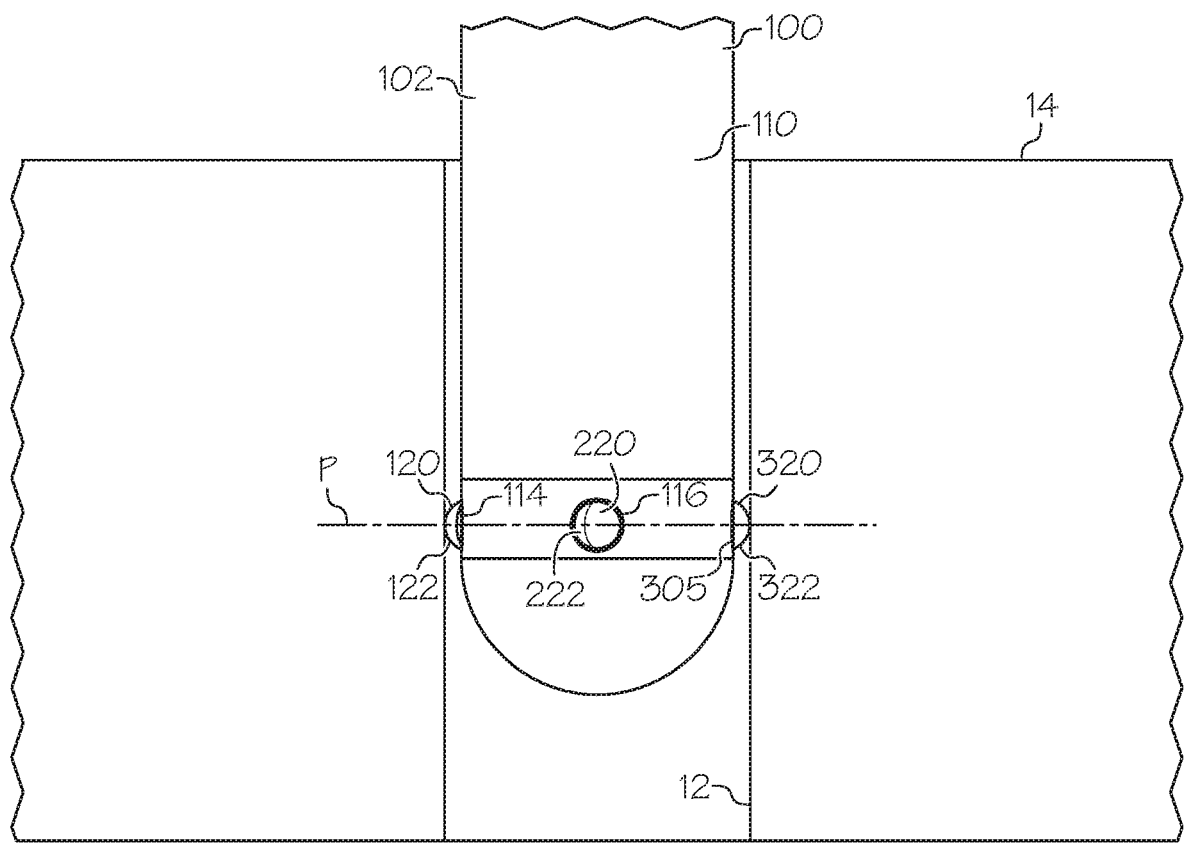
FIG. 8 is an elevational view, partially in cross-section, depicting the probe portion of the plug gauge shown in FIG. 2 inserted into a bore formed in a structure.

In one implementation, the support 16 may include a robotic arm 18. As shown in FIG. 8, the robotic arm 18 (FIG. 1) may be controlled to insert the probe portion 102 of the plug gauge 100 into a bore 12 in a structure 14 for taking multiple simultaneous diametric measurements of the bore 12. In one example, the robotic arm 18 positions the probe portion 102 of the plug gauge 100 within the bore 12 (at a stationary position along the longitudinal-central axis $A_B$ of the bore 12) for taking simultaneous diametric measurements of the bore 12. In another example, the robotic arm 18 linearly moves the probe portion 102 of the plug gauge 100 through the bore 12 (e.g., along the longitudinal-central axis $A_B$ of the bore 12) for taking a plurality of simultaneous diametric measurements of the bore 12 along the longitudinal-central axis $A_B$ of the bore 12. In another example, the robotic arm 18 rotationally moves the probe portion 102 of the plug gauge 100 within the bore 12 (e.g., about the longitudinal-central axis $A_B$ of the bore 12) for taking a plurality of simultaneous diametric measurements of the bore 12 along the circumference/perimeter of the bore 12. In yet another example, the robotic arm 18 linearly moves the probe portion 102 of the plug gauge 100 along the longitudinal-central axis $A_B$ of the bore 12 while also generally simultaneously rotationally moving the probe portion 102 of the plug gauge 100 about the longitudinal-central axis $A_B$ of the bore 12 for taking a plurality of simultaneous diametric measurements of the bore 12 along both the circumference/perimeter of the bore 12 and the longitudinal-central axis $A_B$ of the bore 12.

The computer system 20 of system 10 may be in wired or wireless communication with the sensor portion 104 (specifically, the first sensor 150 and the second sensor 250) of the plug gauge 100 and the robotic arm 18. The computer system 20 is operable to control the robotic arm 18 to automatically position and move the probe portion 102 of the plug gauge 100 relative to the bore 12 in the structure 14. The computer system 20 is also operable to analyze and/or display the output signals from the sensor portion 104 (specifically, the first sensor 150 and the second sensor 250), as well as to calculate diametric measurements based on the output signals from the sensor portion 104 (specifically, the first sensor 150 and the second sensor 250).

Referring to FIGS. 2-7, one example of the disclosed plug gauge 100 includes a probe portion 102 and a sensor portion 104. The probe portion 102 of the plug gauge 100 includes a probe housing 110, a first contact element 120, a second contact element 220, a third contact element 320, a fourth contact element 420, a first cam member 130 and a second cam member 230. As shown in FIG. 1, a coupling portion 106 can be connected to the probe portion 102 of the plug gauge 100.

Figure 2:
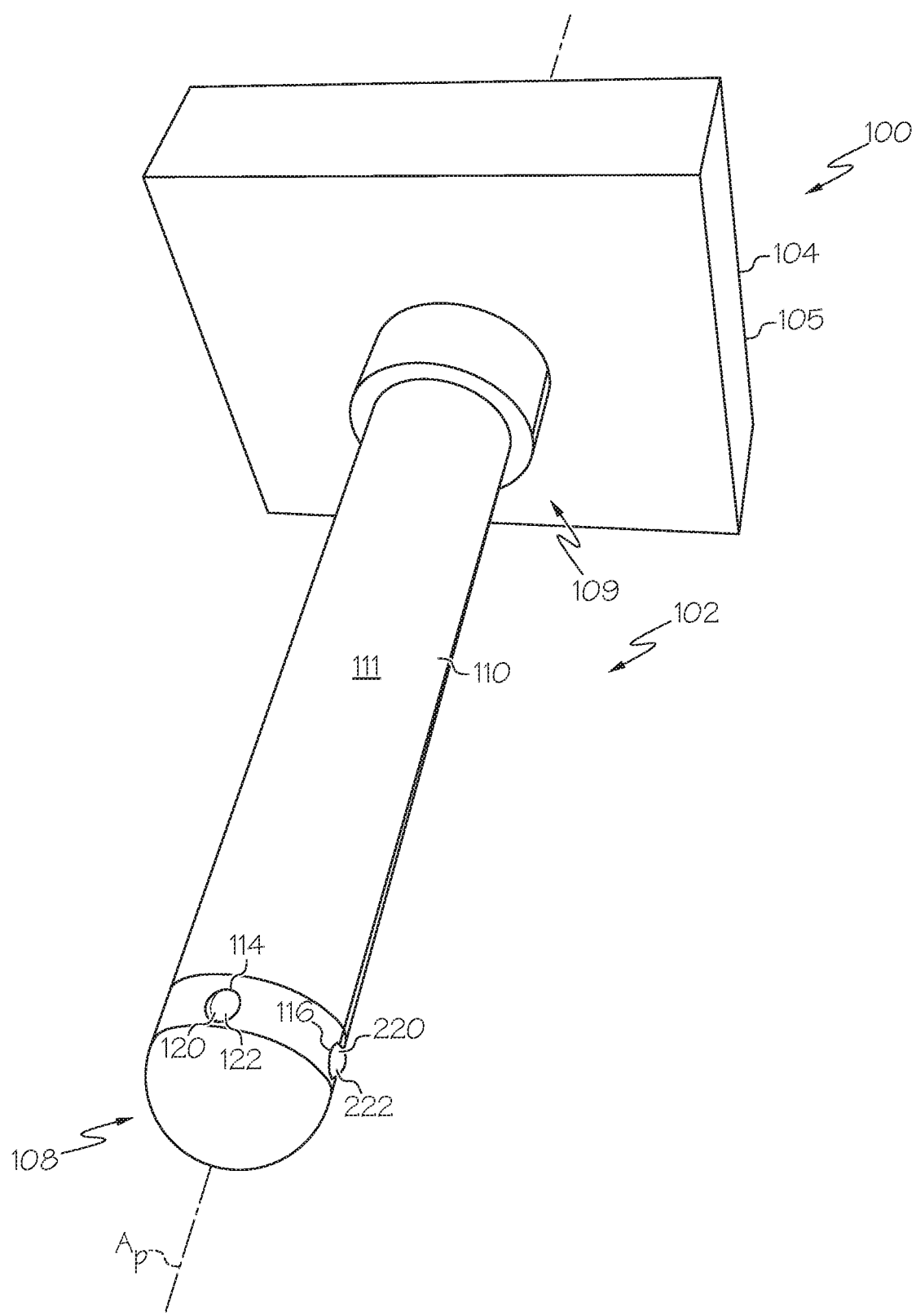
FIG. 2 is a front and side perspective view of the plug gauge shown in FIG. 1.
Figure 3:
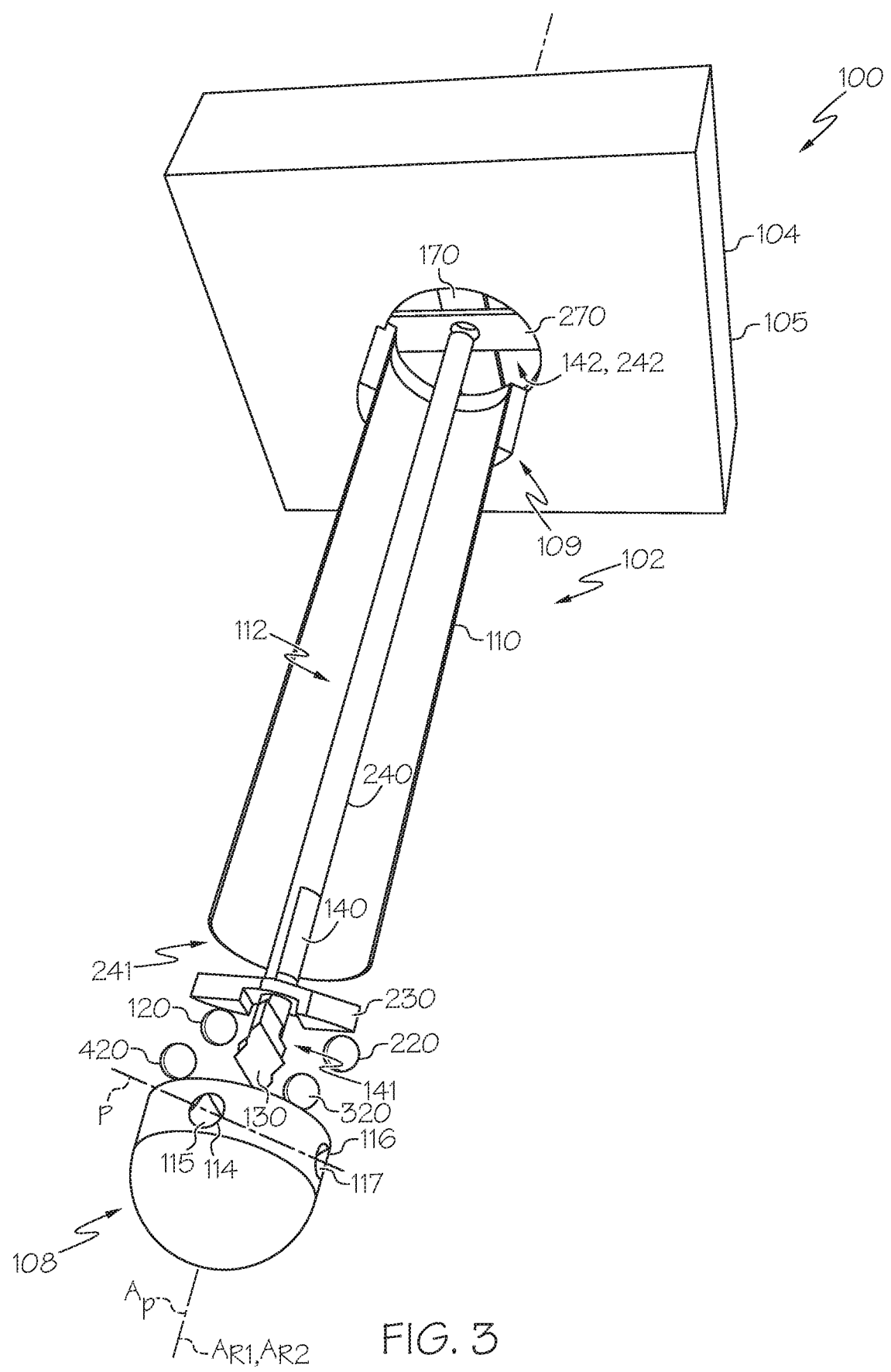
FIG. 3 is an exploded and partial cutaway perspective view of the plug gauge shown in FIG. 2.

As best shown in FIGS. 2 and 3, the probe housing 110 of the plug gauge 100 may be generally tubular, and may define an internal volume 112 (FIG. 3) and a longitudinal axis $A_P$. For example, the probe housing 110 may have an outer surface 111, and the outer surface 111 of the probe housing 110 may be substantially cylindrical. The probe housing 110 may be elongated along the longitudinal axis $A_P$, and may include a distal end portion 108 and a proximal end portion 109 longitudinally opposed from the distal end portion 108 along the longitudinal axis $A_P$.

Figure 4:
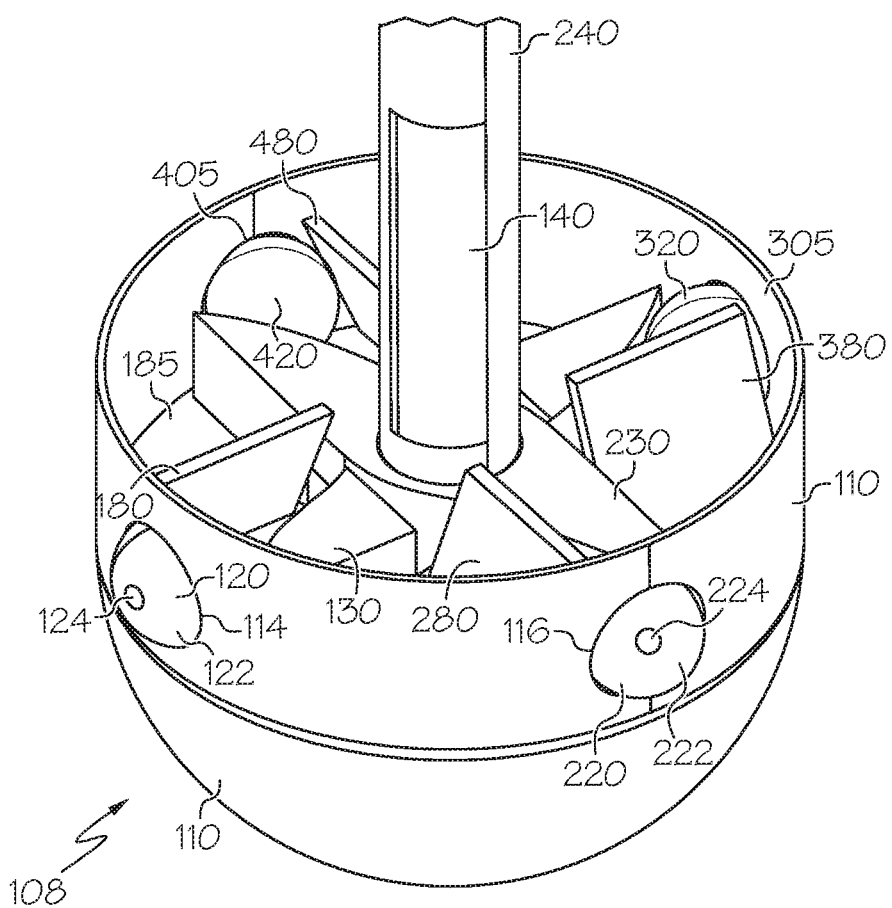
FIG. 4 is a partial cutaway perspective view of a portion of the probe portion of the plug gauge shown in FIG. 2.
Figure 5:
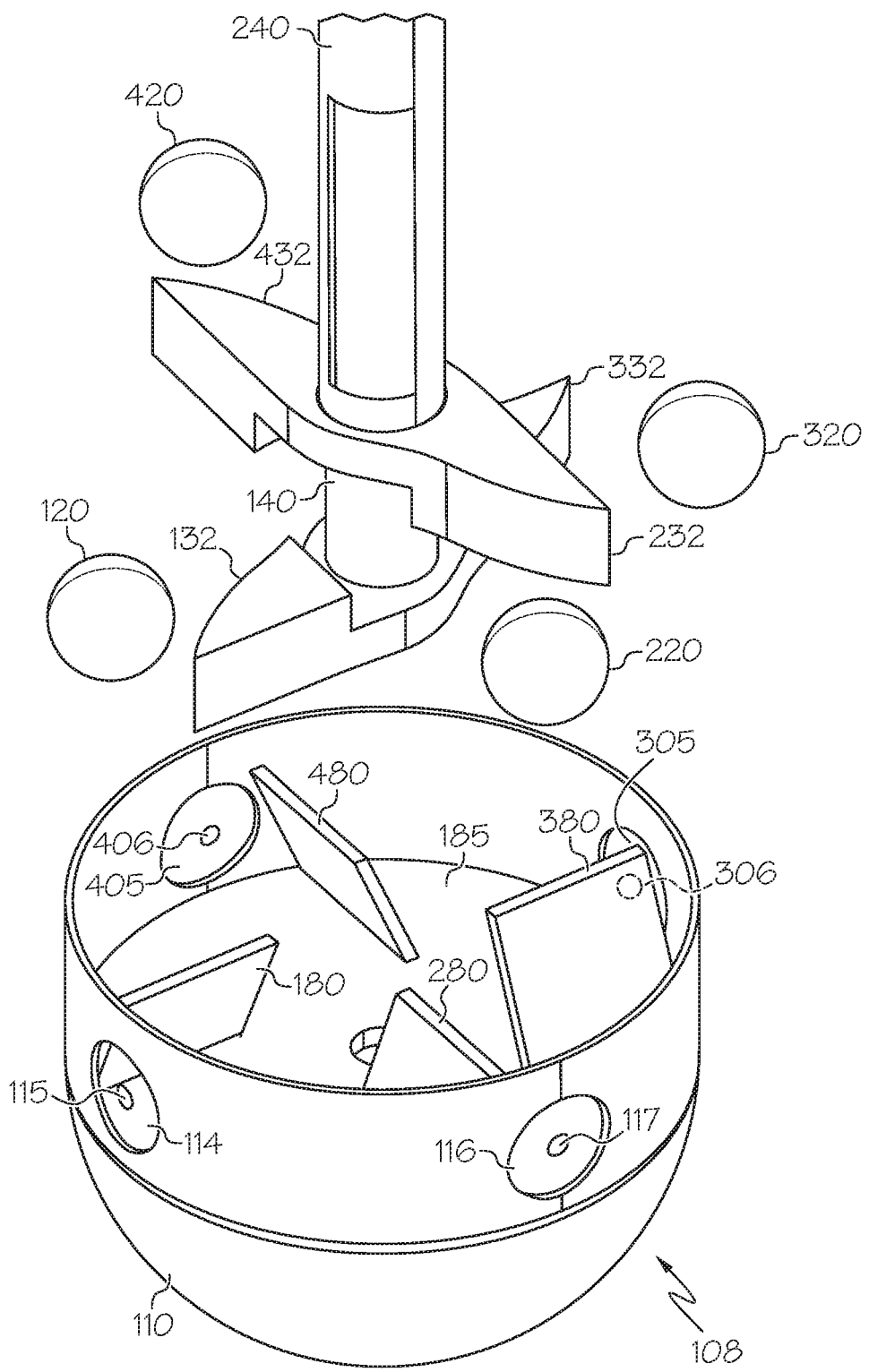
FIG. 5 is an exploded and partial cutaway perspective view of the portion of the probe portion of the plug gauge shown in FIG. 4.

As best shown in FIGS. 4 and 5, the probe housing 110 may define a first opening 114 into the internal volume 112, and a second opening 116 into the internal volume 112, a third opening 305 into the internal volume 112, and a fourth opening 405 into the internal volume 112. The first opening 114, the second opening 116, the third opening 305 and the fourth opening 405 may be disposed proximate (at or near) the distal end portion 108 of the probe housing 110.

As best shown in FIGS. 4 and 8, the first opening 114, the second opening 116, the third opening 305 and the fourth opening 405 may be aligned in a plane P that is substantially perpendicular to the longitudinal axis $A_P$ of the probe housing 110. For example, each of the first opening 114, the second opening 116, the third opening 305 and the fourth opening 405 may be a generally circular opening and may have a centerpoint 115, 117, 306, 406 (FIG. 5), and each centerpoint 115, 117, 306, 406 may lie in plane P.

The first opening 114, the second opening 116, the third opening 305 and the fourth opening 405 may be equidistantly spaced about the probe housing 110. For example, the centerpoint 117 of the second opening 116 may be displaced a non-zero angle Θ (e.g., about 90 degrees) about the longitudinal axis $A_P$ relative to the centerpoint 115 of the first opening 114. Other angular configurations between the first opening 114 and the second opening 116, as well as additional openings (more than openings 114, 116, 305, 405) or fewer openings (less than openings 114, 116, 305, 405), are also contemplated.

As best shown in FIGS. 2, 4, 8 and 9, the first contact element 120 of the plug gauge 100 may be received in the internal volume 112 of the probe housing 110 such that a portion 122 (having contact point 124) of the first contact element 120 extends through the first opening 114. The portion 122 of the first contact element 120 that extends through the first opening 114 may protrude radially (relative to the longitudinal axis $A_P$) outward from the probe housing 110 and beyond the outer surface 111 of the probe housing 110.

The second contact element 220 may be received in the internal volume 112 of the probe housing 110 such that a portion 222 (having contact point 224) of the second contact element 220 extends through the second opening 116. The portion 222 of the second contact element 220 that extends through the second opening 116 may protrude radially (relative to the longitudinal axis $A_P$) outward from the probe housing 110 and beyond the outer surface 111 of the probe housing 110.

Figure 9:
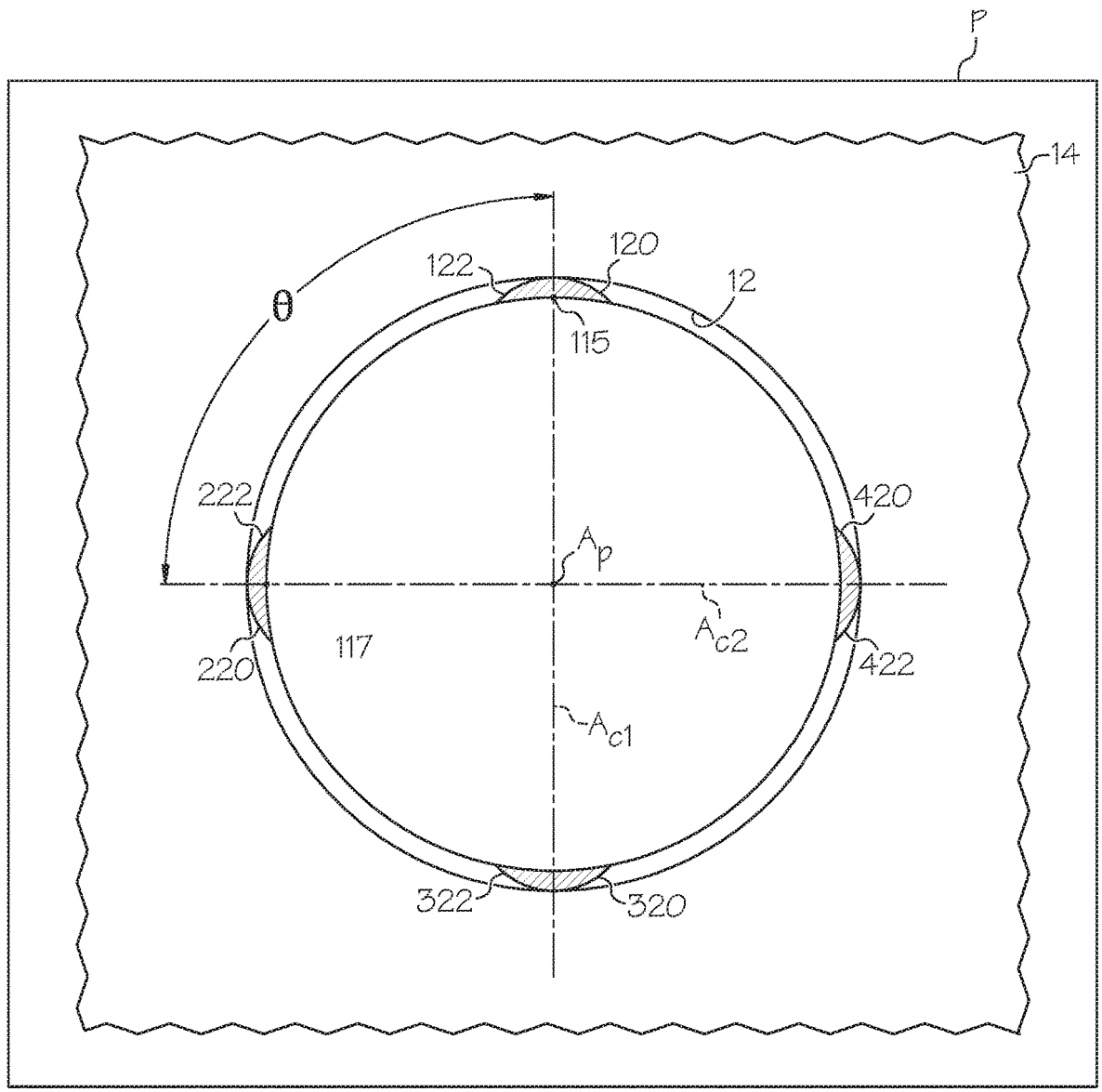
FIG. 9 is a top plan view of the probe portion and structure shown in FIG. 8.

The third contact element 320 may be received in the internal volume 112 of the probe housing 110 such that a portion 322 of the third contact element 320 extends through the third opening 305. The portion 322 of the third contact element 320 that extends through the third opening 305 may protrude radially (relative to the longitudinal axis $A_P$) outward from the probe housing 110 and beyond the outer surface 111 of the probe housing 110. As shown in FIG. 9, the third contact element 320 may be aligned with the first contact element 120 along a first contact element axis $A_{C1}$, which intersects the longitudinal axis $A_P$.

As best shown in FIGS. 2, 4, 8 and 9, the fourth contact element 420 may be received in the internal volume 112 of the probe housing 110 such that a portion 422 of the fourth contact element 420 extends through the fourth opening 405. The portion 422 of the fourth contact element 420 that extends through the fourth opening 405 may protrude radially (relative to the longitudinal axis $A_P$) outward from the probe housing 110 and beyond the outer surface 111 of the probe housing 110. As shown in FIG. 9, the fourth contact element 420 may be aligned with the second contact element 220 along a second contact element axis $A_{C2}$, which intersects the longitudinal axis $A_P$.

As best shown in FIGS. 3-6, in one or more examples, each of the first contact element 120, the second contact element 220, the third contact element 320 and the fourth contact element 420 is substantially spherical. The substantially spherical shape of the contact elements 120, 220, 320, 420 provides a smooth, contoured contact surface to engage the structure 14 (FIG. 1) when the probe portion 102 of the plug gauge 100 is inserted into the bore 12 (FIG. 1) in the structure 14. The smooth, contoured contact surface prevents the contact elements 120, 220, 320, 420 from catching on the structure 14 during insertion into the bore 12.

In other examples, each of the first contact element 120, the second contact element 220, the third contact element 320 and the fourth contact element 420 can have any one of various other shapes. For example, each of the first contact element 120, the second contact element 220, the third contact element 320 and the fourth contact element 420 may include a generally cylindrical shape with rounded or hemispherical ends (e.g., pill capsule-shaped).

Figure 6:
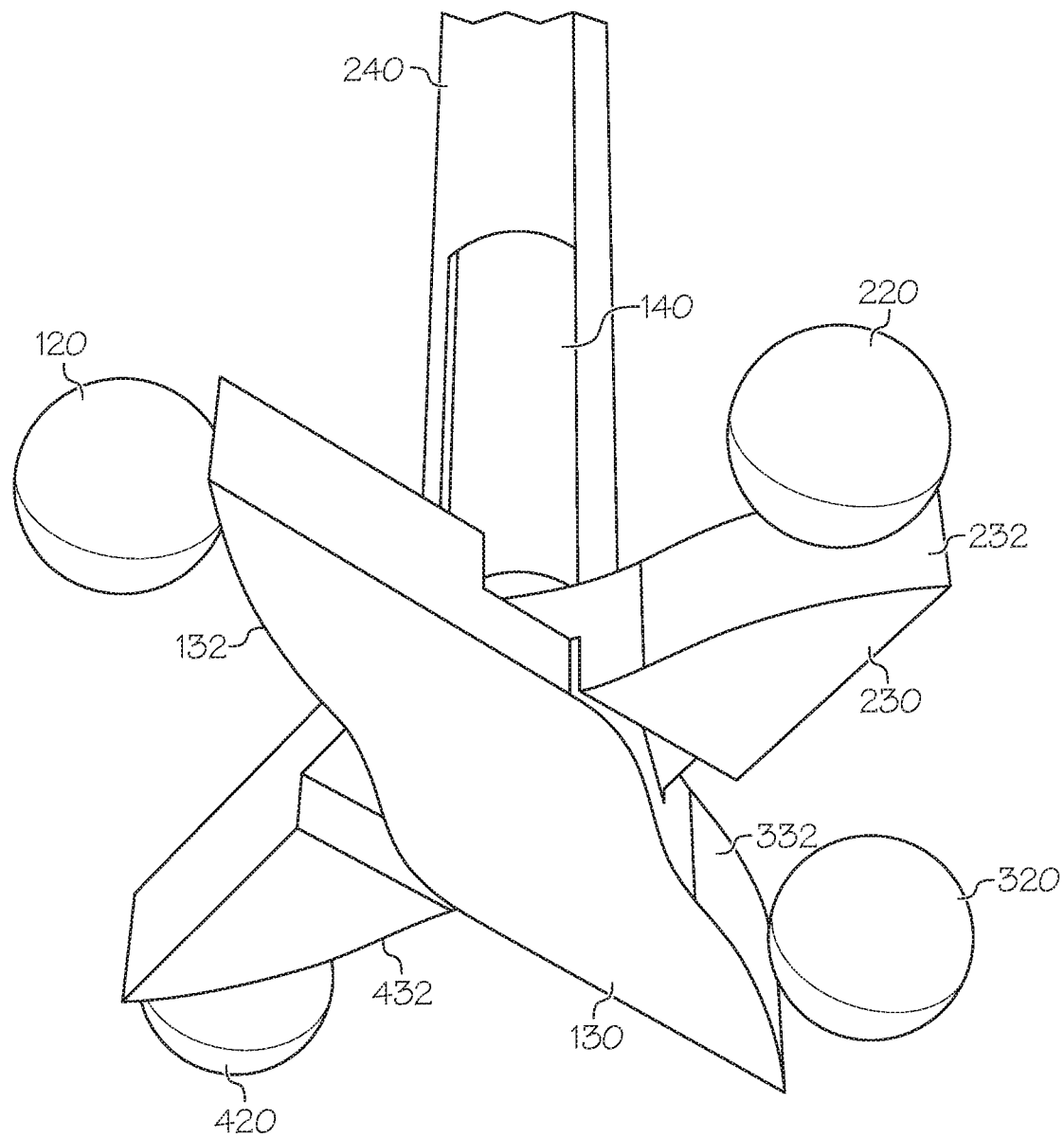
FIG. 6 is an underside perspective view of a portion of the plug gauge shown in FIG. 5.

Referring to FIGS. 3-6, the first cam member 130 of the plug gauge 100 defines a first axis of rotation $A_{R1}$, which may be substantially aligned with the longitudinal axis $A_P$ of the probe housing 110. The first cam member 130 may further define a first camming surface 132 and a second camming surface 332, both of which may be curved, as best shown in FIGS. 5 and 6. The first contact element 120 may be in camming engagement with the first camming surface 132 of the first cam member 130 and the third contact element 320 may be in camming engagement with the second camming surface 332 of the first cam member 130. Therefore, movement of the first contact element 120 and the third contact element 320 relative to the probe housing 110 will cause corresponding rotation of the first cam member 130 about the first axis of rotation $A_{R1}$ (i.e., angular displacement). This angular displacement may be detected (e.g., by first sensor 150) and used to calculate a diametric measurement.

As best shown in FIGS. 4 and 5, the plug gauge 100 may include a base member 185, a first retainer member 180 and a third retainer member 380. The first retainer member 180 and the third retainer member 380 may be fixedly connected to the base member 185. Therefore, when the first contact element 120 is positioned between the first retainer member 180 and the first cam member 130 and the third contact element 320 is positioned between the third retainer member 380 and the first cam member 130, the base member 185, the first retainer member 180 and the third retainer member 380 inhibit movement of the first contact element 120 and the third contact element 320 relative to the probe housing 110 along the longitudinal axis $A_P$ of the probe housing 110.

Figure 7:
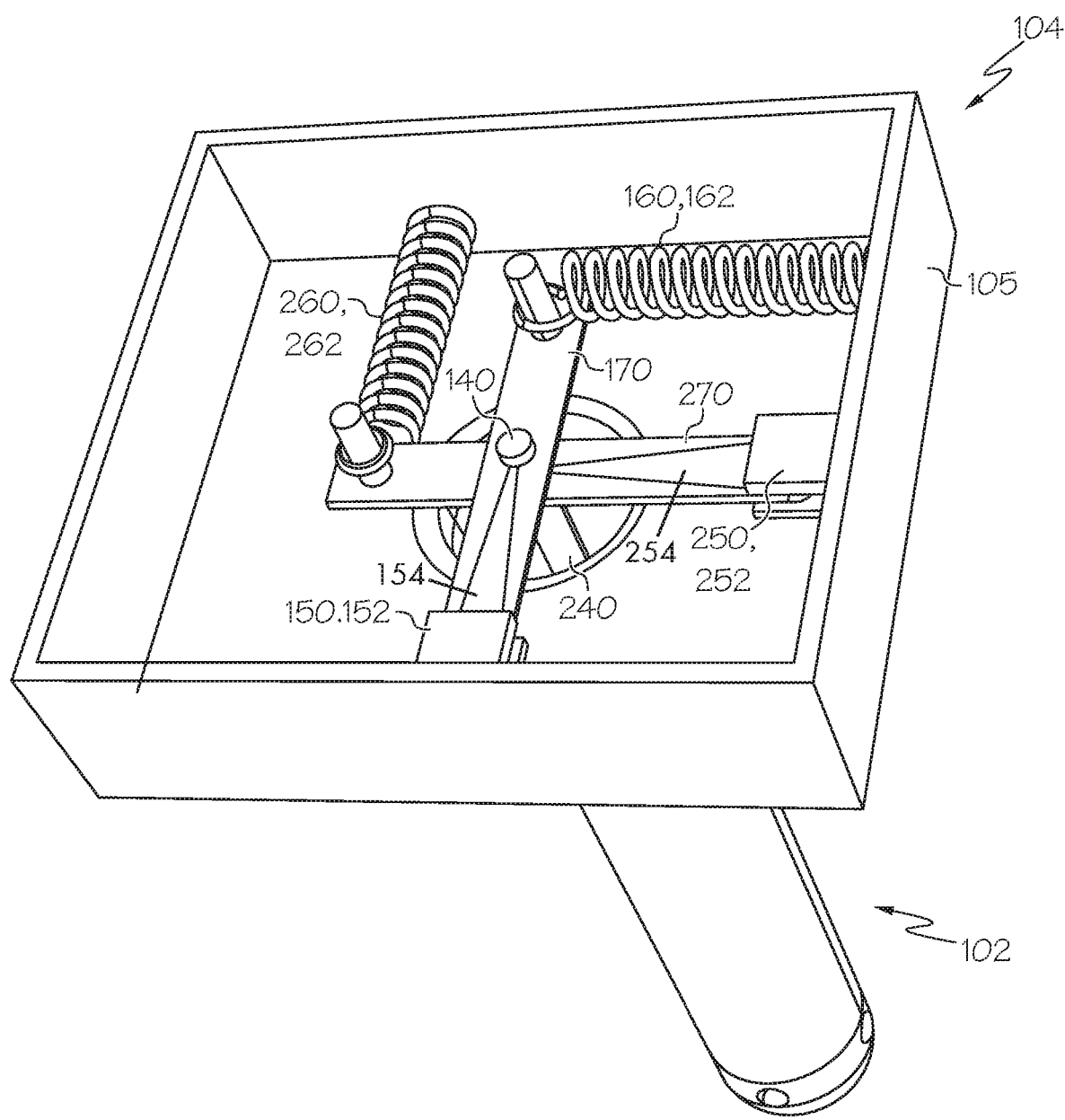
FIG. 7 is a top perspective of the plug gauge shown in FIG. 2, wherein the sensor portion is partially cut away to show the contents thereof.

As shown in FIG. 7, a first biasing element 160 may be operatively connected to the first cam member 130 to bias the first cam member 130 about the first axis of rotation $A_{R1}$ and into camming engagement with the first contact element 120 and the third contact element 320. For example, the first biasing element 160 may be a spring 162, such as a coil spring. The biasing force applied to the first cam member 130 by the first biasing element 160 may bias the first contact element 120 and the third contact element 320 to the configuration in which they protrude radially (relative to the longitudinal axis $A_P$) outward from the probe housing 110 and beyond the outer surface 111 of the probe housing 110.

Referring to FIGS. 3 and 7, the operative connection between the first biasing element 160 and the first cam member 130 may be by way of a first shaft 140 and a first extension member 170. The first biasing element 160 may be connected (e.g., directly) to the first extension member 170. The first shaft 140 may include a distal end portion 141 and a proximal end portion 142 longitudinally opposed from the distal end portion 141 along the first axis of rotation $A_{R1}$. The distal end portion 141 of the first shaft 140 may be fixedly connected to the first cam member 130 and rotatable with the first cam member 130 about the first axis of rotation $A_{R1}$. The first extension member 170 may be fixedly connected to the proximal end portion 142 of the first shaft 140, may protrude radially outward (relative to the first axis of rotation $A_{R1}$) from the first shaft 140, and may be rotatable with the first shaft 140 about the first axis of rotation $A_{R1}$. Therefore, angular displacement of the first cam member 130 about the first axis of rotation $A_{R1}$ causes corresponding angular displacement of the first extension member 170 about the first axis of rotation $A_{R1}$), albeit at a greater radius and, thus, greater circumferential magnitude.

As shown in FIGS. 1 and 7, the plug gauge 100 may include a first sensor 150 for sensing rotation of the first cam member 130 as the first cam member 130 rotates about the first axis of rotation $A_{R1}$. In one configuration, the first sensor 150 may be operatively associated with the first extension member 170 by positioning the first sensor 150 to sense the motion of the first extension member 170 as the first extension member 170 rotates about the first axis of rotation $A_{R1}$ with the first cam member 130. For example, the first sensor 150 may be (or may include) an optical encoder 152 and the first extension member 170 may be marked with indicia 154 that is detectable by the optical encoder 152. Various other configurations for the first sensor 150 are also contemplated.

Referring again to FIGS. 3-6, the second cam member 230 of the plug gauge 100 defines a second axis of rotation $A_{R2}$, which may be substantially aligned with the longitudinal axis $A_P$ of the probe housing 110. The second cam member 230 may further define a first camming surface 232 and a second camming surface 432, both of which may be curved, as best shown in FIGS. 5 and 6. The second contact element 220 may be in camming engagement with the first camming surface 232 of the second cam member 230 and the fourth contact element 420 may be in camming engagement with the second camming surface 432 of the second cam member 230. Therefore, movement of the second contact element 220 and the fourth contact element 420 relative to the probe housing 110 will cause corresponding rotation of the second cam member 230 about the second axis of rotation $A_{R2}$.

As best shown in FIGS. 4 and 5, the plug gauge 100 may further include a second retainer member 280 and a fourth retainer member 480. The second retainer member 280 and the fourth retainer member 480 may be fixedly connected to the base member 185. Therefore, when the second contact element 220 is positioned between the second retainer member 280 and the second cam member 230 and the fourth contact element 420 is positioned between the fourth retainer member 480 and the second cam member 230, the base member 185, the second retainer member 280 and the fourth retainer member 480 inhibit movement of the second contact element 220 and the fourth contact element 420 relative to the probe housing 110 along the longitudinal axis $A_P$ of the probe housing 110.

As shown in FIG. 7, a second biasing element 260 may be operatively connected to the second cam member 230 to bias the second cam member 230 about the second axis of rotation $A_{R2}$ and into camming engagement with the second contact element 220 and the fourth contact element 420. For example, the second biasing element 260 may be a spring 262, such as a coil spring. The biasing force applied to the second cam member 230 by the second biasing element 260 may bias the second contact element 220 and the fourth contact element 420 to the configuration in which they protrude radially (relative to the longitudinal axis $A_P$) outward from the probe housing 110 and beyond the outer surface 111 of the probe housing 110.

Referring to FIGS. 3 and 7, the operative connection between the second biasing element 260 and the second cam member 230 may be by way of a second shaft 240 and a second extension member 270. As shown in FIGS. 3-6, the first shaft 140 may be at least partially received within the second shaft 240 (i.e., the second shaft 240 may be coaxially received over the first shaft 140), yet the second shaft 240 may move independently of the first shaft 140.

The second biasing element 260 may be connected (e.g., directly) to the second extension member 270. The second shaft 240 may include a distal end portion 241 and a proximal end portion 242 longitudinally opposed from the distal end portion 241 along the first axis of rotation $A_{R2}$.

The distal end portion 241 of the second shaft 240 may be fixedly connected to the second cam member 230 and rotatable with the second cam member 230 about the second axis of rotation $A_{R2}$. The second extension member 270 may be fixedly connected to the proximal end portion 242 of the second shaft 240, may protrude radially outward (relative to the second axis of rotation $A_{R2}$) from the second shaft 240, and may be rotatable with the second shaft 240 about the second axis of rotation $A_{R2}$. Therefore, angular displacement of the second cam member 230 about the second axis of rotation $A_{R2}$ causes corresponding angular displacement of the second extension member 270 about the second axis of rotation $A_{R2}$), albeit at a greater radius and, thus, greater circumferential magnitude.

As shown in FIGS. 1 and 7, the plug gauge 100 may include a second sensor 250 for sensing rotation of the second cam member 230 as the second cam member 230 rotates about the second axis of rotation $A_{R2}$. In one configuration, the second sensor 250 may be operatively associated with the second extension member 270 by positioning the second sensor 250 to sense the motion of the second extension member 270 as the second extension member 270 rotates about the second axis of rotation $A_{R2}$ with the second cam member 230. For example, the second sensor 250 may be (or may include) an optical encoder 252 and the second extension member 270 may be marked with indicia 254 that is detectable by the optical encoder 252. Various other configurations for the second sensor 250 are also contemplated.

As shown in FIGS. 1, 3 and 7, the first sensor 150 and the second sensor 250 may be housed in a sensor housing 105. The first extension member 170 and the second extension member 270 may also be housed in the sensor housing 105. Therefore, the first sensor 150, the second sensor 250, the first extension member 170 and the second extension member 270 may be (or may include) the sensor portion 104 of the plug gauge 100.

Figure 10:
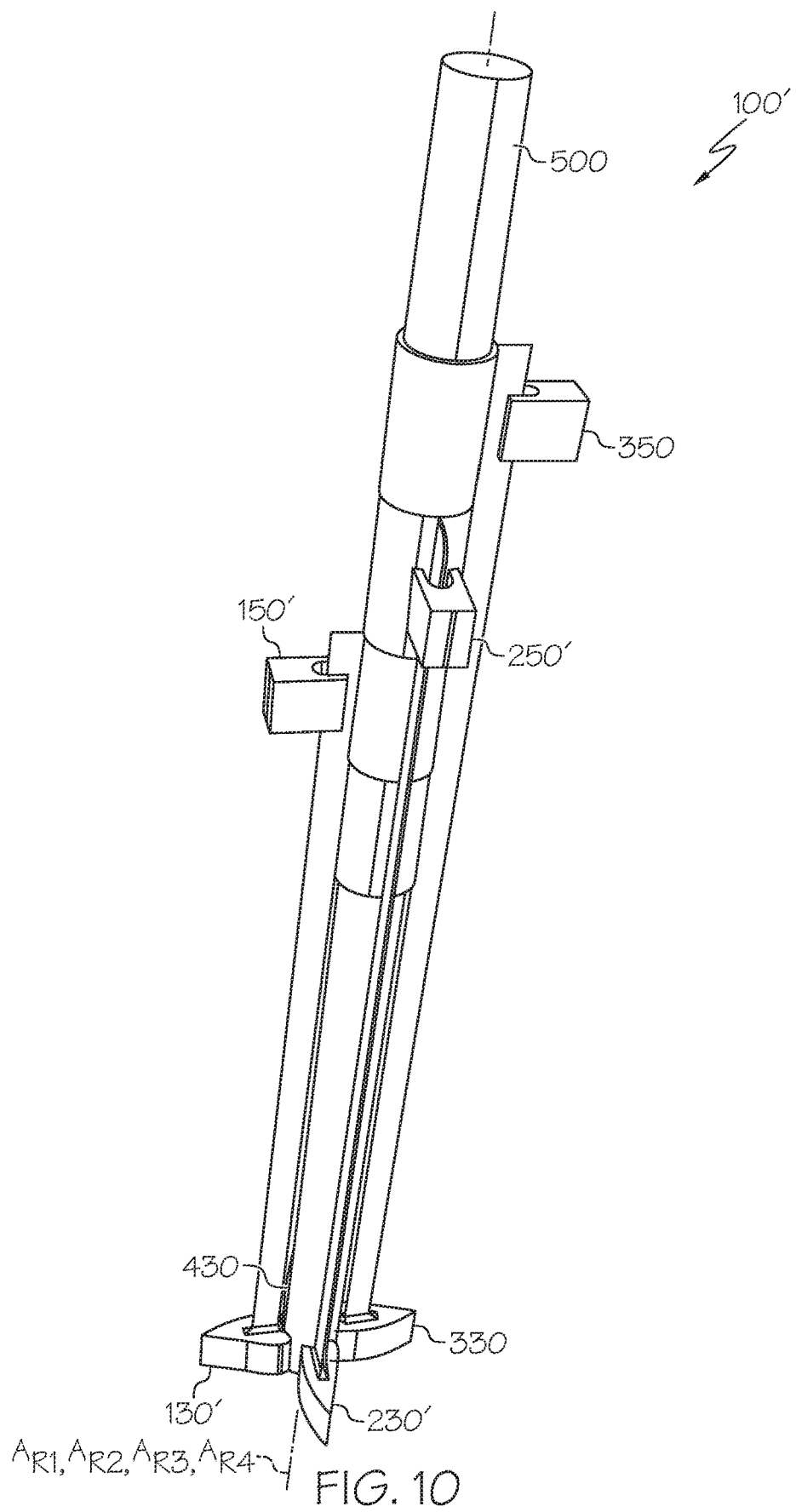
FIG. 10 is a side perspective view of another example of the disclosed plug gauge, wherein the probe housing and contact elements were removed to focus on other structure.
Figure 11:
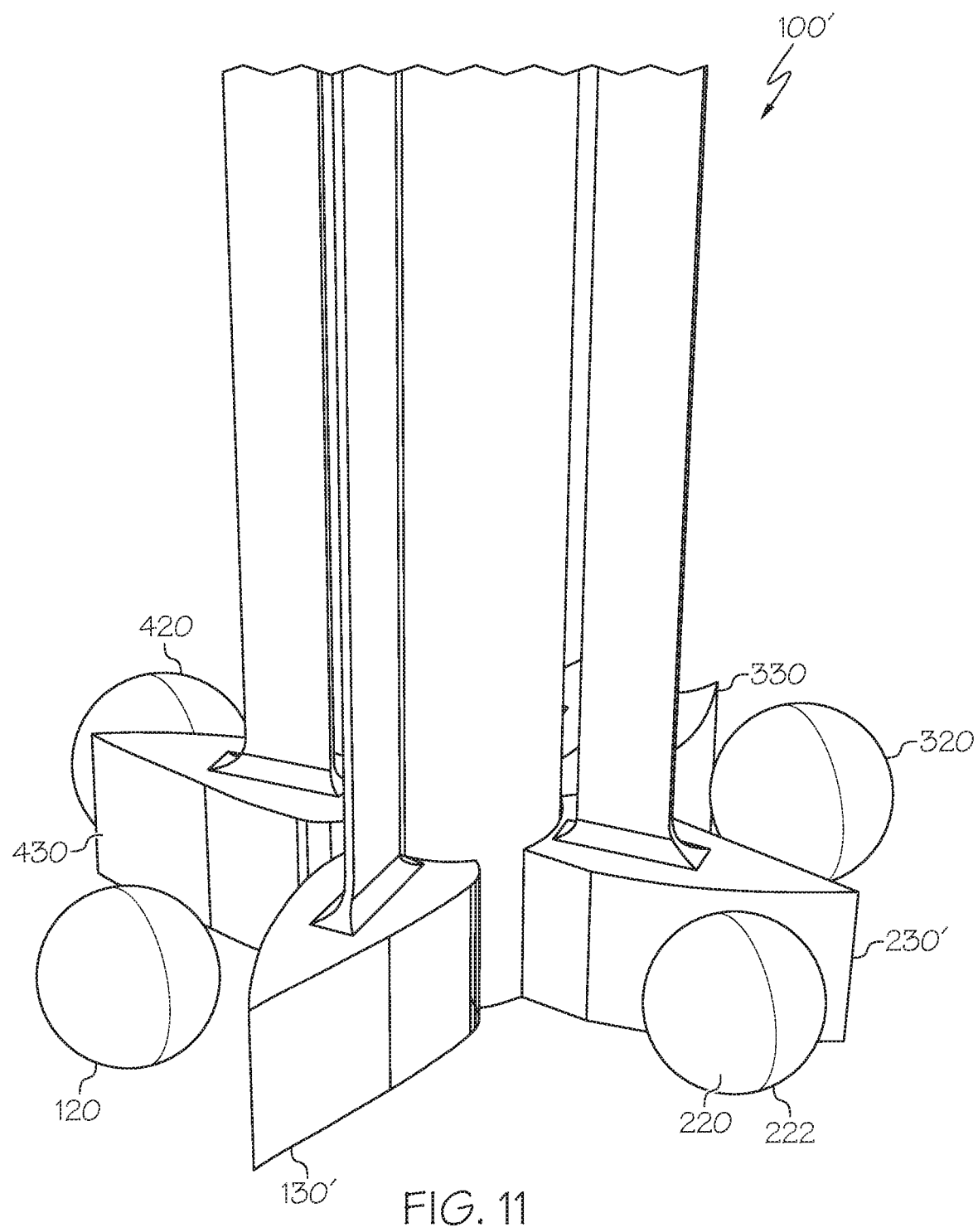
FIG. 11 is a side perspective view of a portion of the plug gauge shown in FIG. 10, but with contact elements present.

Referring to FIGS. 10 and 11, in another example, rather than the first contact element 120 and the third contact element 320 being in camming engagement with the first cam member 130 and the second contact element 220 and the fourth contact element 420 being in camming engagement with the second cam member 230, each contact element 120, 220, 320, 420 is in camming engagement with its own designated cam member 130', 230', 330, 430. Therefore, movement of each contact element 120, 220, 320, 420 relative to the probe housing 110 (see FIG. 2) will cause the corresponding cam member 130', 230', 330, 430 to rotate about its respective axis of rotation $A_{R1}$, $A_{R2}$, $A_{R3}$, $A_{R4}$ (i.e., angular displacement), and these angular displacements may be detected by sensors (like sensors 150, 250, 350) and used to calculate a diametric measurement.

For example, plug gauge 100' may include a probe housing (similar to probe housing 110 shown in FIG. 2), a first contact element 120, a second contact element 220, a third contact element 320, a fourth contact element 420, a first cam member 130', a second cam member 230', a third cam member 330, a fourth cam member 430, and a central shaft 500. While plug gauge 100' is shown having four contact elements 120, 220, 320, 420 and four corresponding cam member 130', 230', 330, 430, those skilled in the art will appreciate that plug gauge 100' may be modified to include fewer than four contact elements 120, 220, 320, 420 (and corresponding 130', 230', 330, 430) or more than four contact elements 120, 220, 320, 420 (and corresponding 130', 230', 330, 430) without departing from the scope of the present disclosure.

The first cam member 130' may define a first axis of rotation $A_{R1}$, may be rotatably connected to the central shaft 500, and may be in camming engagement with the first contact element 120 such that movement of the first contact element 120 relative to the probe housing 110 causes corresponding rotation of the first cam member 130' about the first axis of rotation $A_{R1}$. This rotation of the first cam member 130' can be sensed and used to calculate a diametric measurement.

The second cam member 230' may define a second axis of rotation $A_{R2}$, may be rotatably connected to the central shaft 500, and may be in camming engagement with the second contact element 220 such that movement of the second contact element 220 relative to the probe housing 110 causes corresponding rotation of the second cam member 230' about the second axis of rotation $A_{R2}$. This rotation of the second cam member 230' can be sensed and used to calculate a diametric measurement.

The third cam member 330 may define a third axis of rotation $A_{R3}$, may be rotatably connected to the central shaft 500, and may be in camming engagement with the third contact element 320 such that movement of the third contact element 320 relative to the probe housing 110 causes corresponding rotation of the third cam member 330 about the third axis of rotation $A_{R3}$. This rotation of the third cam member 330 can be sensed and used to calculate a diametric measurement.

The fourth cam member 430 may define a fourth axis of rotation $A_{R4}$, may be rotatably connected to the central shaft 500, and may be in camming engagement with the fourth contact element 420 such that movement of the fourth contact element 420 relative to the probe housing 110 causes corresponding rotation of the fourth cam member 430 about the fourth axis of rotation $A_{R4}$. This rotation of the fourth cam member 430 can be sensed and used to calculate a diametric measurement Also disclosed is a method for taking multiple simultaneous diametric measurements of a bore 12 (FIG. 8) formed in a structure 14 (FIG. 8).

Figure 12:
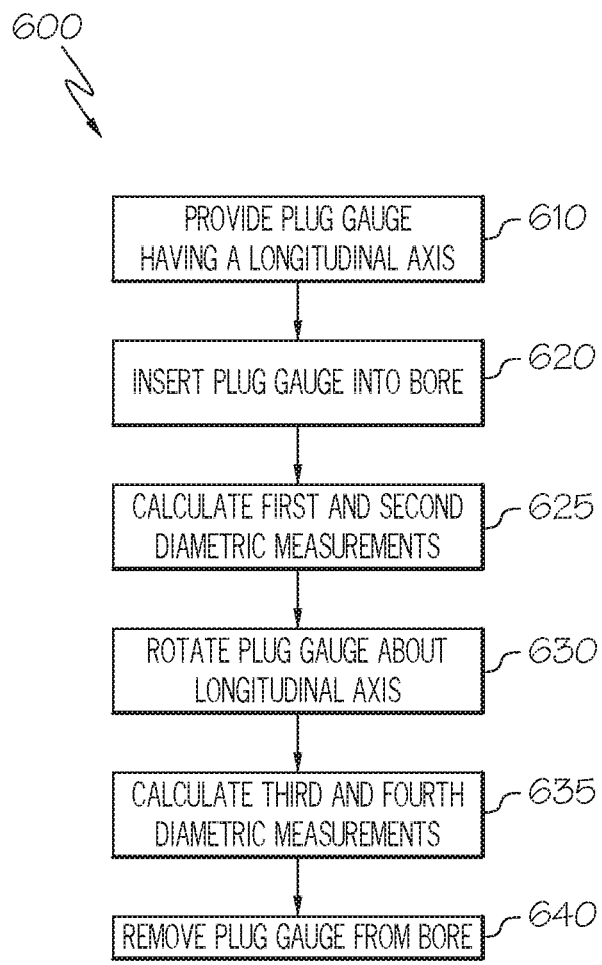
FIG. 12 is a flow diagram depicting one example of the disclosed method for taking multiple simultaneous diametric measurements of a bore.

Referring to FIG. 12, in one example, the disclosed method 600 for taking multiple simultaneous diametric measurements of a bore formed in a structure may begin at block 610 with the step of providing a plug gauge having a longitudinal axis, such as the plug gauge 100 described herein.

At block 620, the method 600 may proceed to inserting the plug gauge 100 into the bore 12 while plug gauge 100 is at a first orientation with respect to the longitudinal axis $A_P$ of the plug gauge 100. The inserting (block 620) may be performed by a robotic arm 18 controlled by a computer system 20.

At block 625, the method 600 may proceed to calculating a first diametric measurement based at least upon a position of the first contact element 120 relative to the probe housing 110 and a second diametric measurement based at least upon a position of the second contact element 220 relative to said probe housing 110. The first diametric measurement and the second diametric measurement may be calculated while the plug gauge 100 is at the first orientation with respect to said longitudinal axis $A_P$. The first diametric measurement and the second diametric measurement may be calculated simultaneously.

At block 630, the method 600 may proceed to rotating the plug gauge 100 about the longitudinal axis $A_P$ to a second orientation with respect to the longitudinal axis $A_P$. The rotating (block 630) may be performed by a robotic arm 18 controlled by a computer system 20.

At block 635, the method 600 may proceed to calculating a third diametric measurement based at least upon a position of said first contact element 120 relative to the probe housing 110 and a fourth diametric measurement based at least upon a position of said second contact element 220 relative to said probe housing 110. The third diametric measurement and the fourth diametric measurement may be calculated while the plug gauge 100 is at the second orientation with respect to said longitudinal axis AP. The third diametric measurement and the fourth diametric measurement may be calculated simultaneously.

At block 640, the method 600 may proceed to withdrawing the plug gauge 100 from the bore 12 in the structure 14. The withdrawing may be performed by a robotic arm 18 controlled by a computer system 20.

Figure 13:
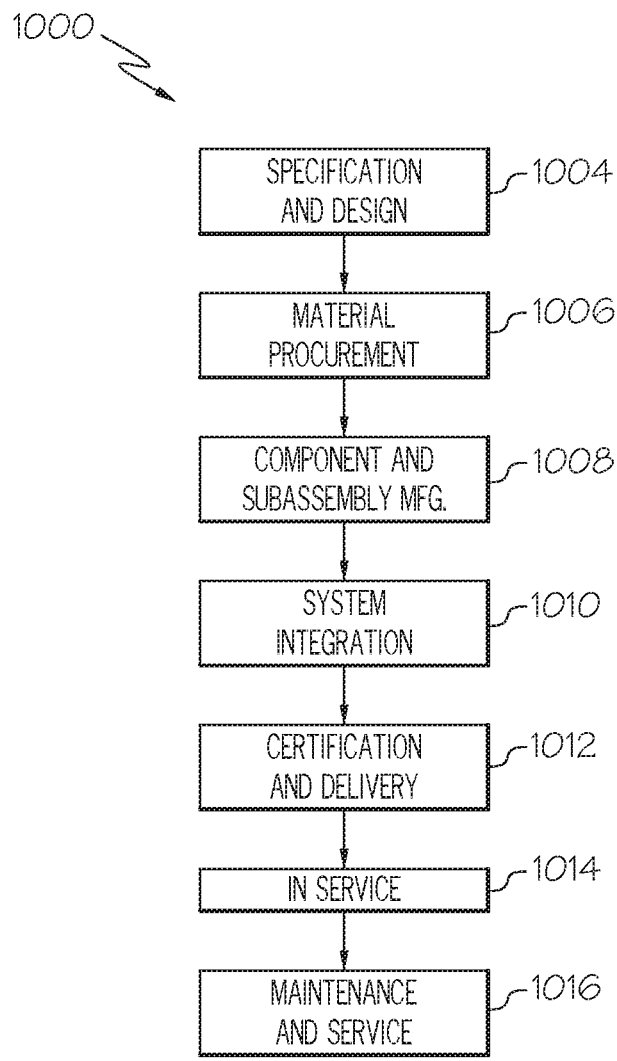
FIG. 13 is a flow diagram of an aircraft manufacturing and service methodology.
Figure 14:
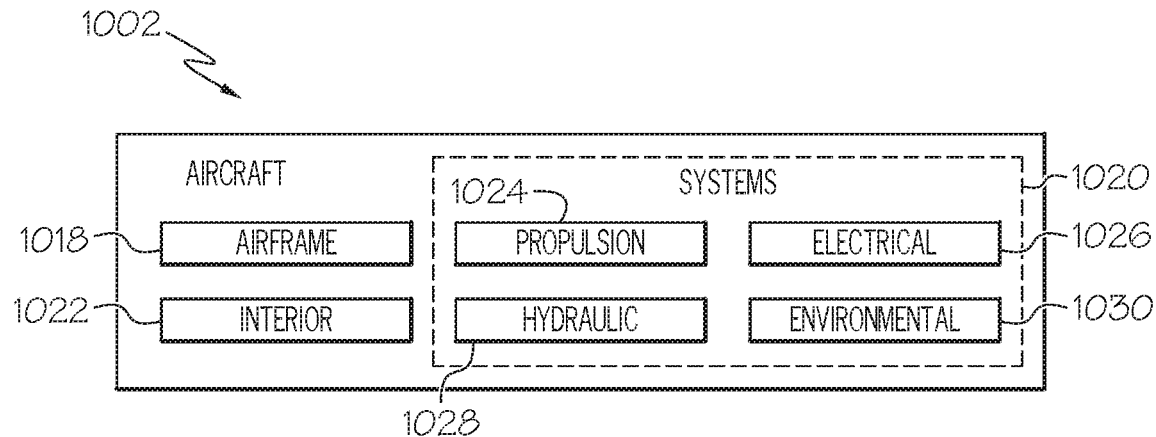
FIG. 14 is a block diagram of an aircraft.

Examples of the disclosure may be described in the context of an aircraft manufacturing and service method 1000, as shown in FIG. 13, and an aircraft 1002, as shown in FIG. 14. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed plug gauges and associated systems and methods may be employed during any one or more of the stages of the aircraft manufacturing and service method 1000. As one example, the disclosed plug gauges may be employed during material procurement 1006. As another example, components or subassemblies corresponding to component/subassembly manufacturing 1008, system integration 1010, and or maintenance and service 1016 may be fabricated or manufactured using the disclosed plug gauges. As another example, the airframe 1018 and the interior 1022 may be constructed using the disclosed plug gauges. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

The disclosed plug gauges and associated systems and methods are described in the context of an aircraft; however, one of ordinary skill in the art will readily recognize that the disclosed plug gauges and associated systems and methods may be utilized for a variety of applications. For example, the disclosed plug gauges and associated systems and methods may be implemented in various types of vehicles, including, for example, helicopters, passenger ships, automobiles and the like.

Although various examples of the disclosed plug gauges and associated systems and methods have been shown and described, modifications may occur to those skilled in the art upon reading the specification. The present application includes such modifications and is limited only by the scope of the claims.

What is claimed is:

1. A plug gauge comprising:
   a probe housing defining an internal volume and a longitudinal axis, said probe housing comprising a first opening into said internal volume and a second opening into said internal volume;
   a first contact element received in said internal volume of said probe housing, wherein a portion of said first contact element extends through said first opening;
   a first cam member defining a first axis of rotation, said first cam member being in camming engagement with said first contact element such that movement of said first contact element relative to said probe housing causes corresponding rotation of said first cam member about said first axis of rotation;
   a second contact element received in said internal volume of said probe housing, wherein a portion of said second contact element extends through said second opening; and
   a second cam member defining a second axis of rotation, said second cam member being in camming engagement with said second contact element such that movement of said second contact element relative to said probe housing causes corresponding rotation of said second cam member about said second axis of rotation.

2. The plug gauge of claim 1 wherein a centerpoint of said first opening and a centerpoint of said second opening lie in a plane that is substantially perpendicular to said longitudinal axis of said probe housing.

3. The plug gauge of claim 2 wherein said centerpoint of said second opening is displaced a non-zero angle about said longitudinal axis relative to said centerpoint of said first opening.

4. The plug gauge of claim 1 wherein at least one of said first contact element and said second contact element are substantially spherical.

5. The plug gauge of claim 1 further comprising:
   a first biasing element biasing said first cam member into camming engagement with said first contact element, and
   a second biasing element biasing said second cam member into camming engagement with said second contact element.

6. The plug gauge of claim 1 wherein:
   said first cam member defines a camming surface in camming engagement with said first contact element, said camming surface being curved, and
   said second cam member defines a camming surface in camming engagement with said second contact element, said camming surface being curved.

7. The plug gauge of claim 1 wherein at least one of said first axis of rotation and said second axis of rotation are substantially aligned with said longitudinal axis of said probe housing.

8. The plug gauge of claim 1 further comprising a first sensor sensing said rotation of said first cam member about said first axis of rotation and a second sensor sensing said rotation of said second cam member about said second axis of rotation.

9. The plug gauge of claim 8 further comprising:
a first shaft fixedly connected to said first cam member and rotatable with said first cam member about said first axis of rotation; and
a second shaft fixedly connected to said second cam member and rotatable with said second cam member about said second axis of rotation.

10. The plug gauge of claim 9 wherein said first shaft is at least partially received within said second shaft.

11. The plug gauge of claim 9 further comprising:
a first extension member fixedly connected to said first shaft and radially extending from said first shaft, wherein said first extension member is operatively associated with said first sensor; and
a second extension member fixedly connected to said second shaft and radially extending from said second shaft, wherein said second extension member is operatively associated with said second sensor.

12. The plug gauge of claim 1 further comprising:
a first retainer member positioned to inhibit movement of said first contact element relative to said probe housing along said longitudinal axis, wherein said first contact element is positioned between said first retainer member and said first cam member; and
a second retainer member positioned to inhibit movement of said second contact element relative to said probe housing along said longitudinal axis, wherein said second contact element is positioned between said second retainer member and said second cam member.

13. The plug gauge of claim 1 further comprising:
a third contact element received in said internal volume of said probe housing, wherein a portion of said third contact element extends through a third opening in said probe housing, wherein said third contact element is aligned with said first contact element along a first contact element axis; and
a fourth contact element received in said internal volume of said probe housing, wherein a portion of said fourth contact element extends through a fourth opening in said probe housing, wherein said fourth contact element is aligned with said second contact element along a second contact element axis.

14. The plug gauge of claim 13:
wherein said third contact element is in camming engagement with said first cam member, and
wherein said fourth contact element is in camming engagement with said second cam member.

15. The plug gauge of claim 13 further comprising:
a third cam member defining a third axis of rotation, said third cam member being in camming engagement with said third contact element such that movement of said third contact element relative to said probe housing causes corresponding rotation of said third cam member about said third axis of rotation; and
a fourth cam member defining a fourth axis of rotation, said fourth cam member being in camming engagement with said fourth contact element such that movement of said fourth contact element relative to said probe housing causes corresponding rotation of said fourth cam member about said fourth axis of rotation.

16. The plug gauge of claim 15 further comprising a central shaft, wherein said first cam member, said second cam member, said third cam member, and said fourth cam member are rotatably connected to said central shaft.

17. The plug gauge of claim 1 wherein said probe housing, said first contact element, said first cam member, said second contact element, and said second cam member comprise a probe portion of said plug gauge, and further comprising a coupling portion connected to said probe portion.

18. A system for taking multiple simultaneous diametric measurements of a bore formed in a structure, said system comprising:
said plug gauge of claim 1 sized to be received in said bore; and
a support connected to said plug gauge.

19. A method for taking multiple simultaneous diametric measurements of a bore formed in a structure, said method comprising:
inserting said plug gauge of claim 1 into said bore while said plug gauge is at a first orientation with respect to said longitudinal axis;
rotating said plug gauge about said longitudinal axis to a second orientation with respect to said longitudinal axis; and
withdrawing said plug gauge from said bore.

20. A plug gauge comprising:
a probe housing defining an internal volume and a longitudinal axis, said probe housing comprising a first opening into said internal volume, a second opening into said internal volume, a third opening into said internal volume, and a fourth opening into said internal volume, wherein said first opening, said second opening, said third opening, and said fourth opening are aligned in a plane that is substantially perpendicular to said longitudinal axis of said probe housing;
a first contact element received in said internal volume of said probe housing, wherein a portion of said first contact element extends through said first opening;
a first cam member defining a first axis of rotation, said first cam member being in camming engagement with said first contact element such that movement of said first contact element relative to said probe housing causes corresponding rotation of said first cam member about said first axis of rotation;
a second contact element received in said internal volume of said probe housing, wherein a portion of said second contact element extends through said second opening;
a second cam member defining a second axis of rotation, said second cam member being in camming engagement with said second contact element such that movement of said second contact element relative to said probe housing causes corresponding rotation of said second cam member about said second axis of rotation;
a third contact element received in said internal volume of said probe housing, wherein a portion of said third contact element extends through said third opening in said probe housing, and wherein said third contact element is aligned with said first contact element along a first contact element axis;
a third cam member defining a third axis of rotation, said third cam member being in camming engagement with said third contact element such that movement of said third contact element relative to said probe housing causes corresponding rotation of said third cam member about said third axis of rotation;
a fourth contact element received in said internal volume of said probe housing, wherein a portion of said fourth contact element extends through said fourth opening in said probe housing, and wherein said fourth contact element is aligned with said second contact element along a second contact element axis; and
a fourth cam member defining a fourth axis of rotation, said fourth cam member being in camming engagement with said fourth contact element such that movement of said fourth contact element relative to said probe housing causes corresponding rotation of said fourth cam member about said fourth axis of rotation.

* * * * *